United States Patent [19]

Bobeck et al.

[11] 3,836,898

[45] Sept. 17, 1974

[54] MAGNETIC BUBBLE STRUCTURE FOR SUPPRESSION OF DYNAMIC BUBBLE CONVERSION

[75] Inventors: Andrew Henry Bobeck, Chatham; Joseph Edward Geusic; Fred Bassett Hagedorn, both of Berkeley Heights, all of N.J.

[73] Assignee: Bell Telephone Laboratories, Incorporated, Murray Hill, N.J.

[22] Filed: Oct. 9, 1973

[21] Appl. No.: 404,424

[52] U.S. Cl. .................. 340/174 TF, 340/174 QA, 340/174 SR

[51] Int. Cl. ........................ G11c 11/14, G11c 19/00

[58] Field of Search .. 340/174 TF, 174 QA, 174 SR

[56] References Cited

UNITED STATES PATENTS

| | | | |
|---|---|---|---|
| 3,643,238 | 2/1972 | Bobeck et al. | 340/174 TF |
| 3,688,282 | 8/1972 | Buhrer | 340/174 TF |
| 3,701,127 | 10/1972 | Bobeck et al. | 340/174 TF |

OTHER PUBLICATIONS

IBM Tech. Disc. Bull. "Suppression of Hard Bubbles by a Thin Permalloy Layer" by Giess et al.; Vol. 16; No. 5; 10/73; 340–174 TF.

Bell System Technical Journal "Effect of a Second Magnetic Layer on Hard Bubbles" by Rosencwaig; July–Aug. 1972; p. 1440–1444; 340–174TF.

IBM Tech. Disc. Bull. "Composite Cylindrical Magnetic Domain Materials," by Ahn et al.; Vol. 13; No.11; p. 3220; 340–174TF.

IBM Tech. Disc. Bull. "Bubble Domain Associative Memory" by Ahn et al.; Vol. 15; No. 6; 11/72; p. 2017, 2018; 340–174TF.

IBM Tech. Disc. Bull. "Generation of Bubble Domain Through Exchange Coupling" by Hayashi; Vol. 15; No. 8; 1/73; 340–174TF. p. 2652 & 2653.

*Primary Examiner*—Stanley M. Urynowicz, Jr.
*Attorney, Agent, or Firm*—H. M. Shapiro

[57] ABSTRACT

The dynamic conversion of a normal magnetic bubble to a relatively low mobility form during high-speed operation of bubble devices is suppressed in structures which tolerate only negligible changes in the magnetic configuration of the wall of the bubble.

7 Claims, 12 Drawing Figures

MAGNETIC BUBBLE STRUCTURE FOR SUPPRESSION OF DYNAMIC BUBBLE CONVERSION

FIELD OF THE INVENTION

This invention relates to magnetic memories and more particularly to such memories in which information is represented as patterns of single wall magnetic domains.

BACKGROUND OF THE INVENTION

Single wall magnetic domains, the most familiar of which are termed magnetic "bubbles," are well known in the art. The movement of magnetic bubbles in a layer of a suitable magnetic material is achieved by providing localized magnetic gradients in the plane of bubble movement. When a sequence of such gradients are consecutively offset with respect to a position occupied by a bubble, the bubble follows the gradient sequence.

U.S. Pat. No. 3,534,347 of A. H. Bobeck, issued Oct. 13, 1970 describes what is commonly referred to as the "field-access" arrangement for moving magnetic bubbles. In the field-access arrangement, a pattern of magnetic elements is arranged in a plane coupled to the bubble layer. The pattern usually comprises magnetically soft material such as permalloy arranged in T and bar-shaped elements or chevron-shaped elements as is well known. The elements respond to a magnetic field rotating in the plane of bubble movement to produce the requisite consecutively offset field gradients.

Bubbles are moved at a velocity determined by the frequency of the rotating magnetic field and by the properties of the layer in which bubble movement occurs. Recently, limitations to that velocity due to the formation of "hard" bubbles have been uncovered and reported in the literature, for example, in an article entitled "Dynamic Properties of 'Hard' Magnetic Bubbles," by G. P. Vella Coleiro, A. Rosencwaig, and W. J. Tabor, *Physics Review Letters*, Vol. 29, No. 14, Oct. 2, 1972. Hard bubbles are single wall domains with wall configurations different from normal bubbles. These bubbles are relatively immobile and move at velocites and in directions different from normal bubbles responsive to a given rotating drive field.

It is known that structures can be formed which do not exhibit hard bubbles. Typically, an epitaxial bubble layer which includes an ion implanted surface region, a multilayer fine structure, or a thin permalloy overlay does not exhibit hard bubbles.

It has also been discovered that at relatively high drive field frequencies, normal bubbles are converted into relatively immobile bubbles. This dynamic bubble conversion results in a limitation to high frequency bubble operation at a level below that allowed by the intrinsic mobility of a bubble material. The suppression of this dynamic bubble conversion, of course, leads to an increase in operating frequency of bubble devices.

BRIEF DESCRIPTION OF THE INVENTION

The present invention is based on the recognition that dynamic bubble conversion is due to changes in the magnetic configuration of the wall structure of domains when moved, for example, by a reorienting magnetic drive field. Accordingly, structures which are configured to avoid such changes in the walls of magnetic bubbles have been built and tested and are operative to suppress dynamic bubble conversion. Experiments indicate that higher operating speeds are achieved in bubble devices structured to avoid conversion when compared to analogous bubble devices not so structured.

In one illustrative bubble device in accordance with one aspect of this invention, a first epitaxial bubble layer is grown by liquid phase techniques on a suitable nonmagnetic substrate. A thin nonmagnetic epitaxial layer is formed on the surface of the first epitaxial layer and a second magnetic epitaxial layer is formed on the surface of that nonmagnetic layer. A magnetic bubble moved in the second magnetic epitaxial layer is magnetostatically coupled to an associate bubble in the first epitaxial layer.

In operation bubbles in the illustrative device appear as the movement of single bubbles in one epitaxial film. But that film has an interstitial nonmagnetic layer which has a thickness to permit magnetostatic coupling between and is operative to prevent exchange coupling between the spins in the walls of two associated bubbles in the two layers of the film. The result is the avoidance of modes which lead to the formation of relatively immobile bubbles during operation.

DETAILED DESCRIPTION

Figure 1:
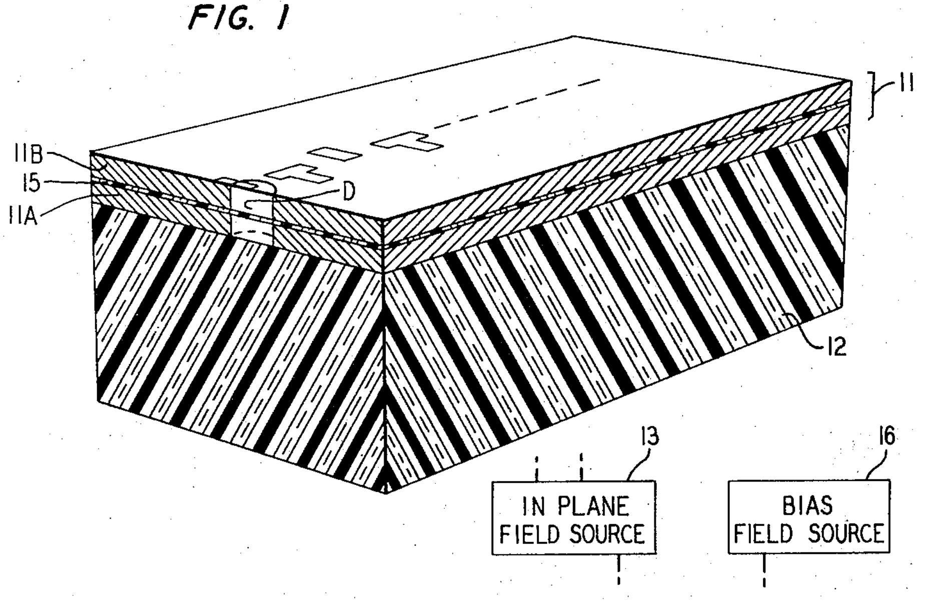
FIGS. 1, 11, and 12 are schematic representations of multilayer bubble films useful for bubble propagation in accordance with this invention.

FIG. 1 shows a layer of bubble material 11 in which single wall domains, such as D, can be moved. Layer 11 typically comprises an epitaxially grown garnet film on a nonmagnetic garnet substrate 12.

In accordance with the present invention, layer 11 has a fine structure which allows only negligible changes to occur in the magnetic configuration of domain D when that domain is displaced, at above a velocity characteristic of layer 11, in response to a magnetic field rotating in the plane of that layer. The rotating field is supplied by means represented by block 13 in FIG. 1. The fine structure in accordance with one embodiment of this invention comprises first and second layers 11A and 11B of epitaxially grown (bubble) material in which bubbles can be moved as well as an intermediate layer 15 of nonmagnetic material.

A bubble moves in layer 11 exactly as in prior art bubble layers. But actually, a "bubble" is confined to the first and second magnetic epitaxial layers of magnetic material and the intermediate layer is operative to eliminate exchange coupling between the spins of the two layers of bubble material. The resulting configuration for a bubble thus may be visualized as two foreshortened bubbles held in registry by magnetostatic forces but separated by the intermediate nonmagnetic layer. The intermediate layer need have a thickness of only about 25 Angstroms to permit operation in this manner.

The diameter of domain D is maintained by a bias field source represented by block 16 of FIG. 1.

Figure 2:
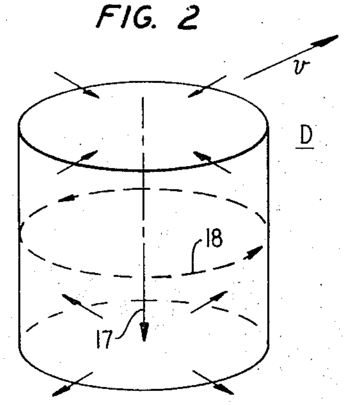
FIGS. 2, 3, 4, and 9 are imaginary schematic representations of a bubble showing alternative magnetic structures of the wall thereabout.
Figure 3:
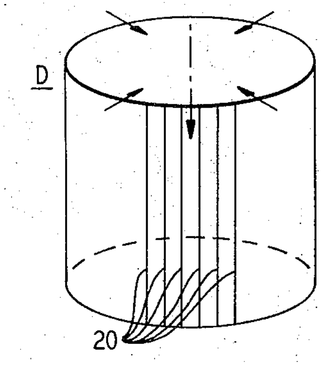

The utility of the intermediate layer in allowing only negligible magnetic changes in the wall of a domain D moved responsive to the rotating drive field can be understood in terms of the following hypothesis rendered in connection with FIGS. 2, 3 . . . . 12.

Consider a domain D in which the magnetization is directed downward as represented by arrow 17 in FIG. 2. The domain is represented as the right circular cylinder shown in the figure and having a domain wall thereabout. The wall has an idealized thickness represented by the lines of the cylinder. The magnetization at the top of the domain wall is represented as radially aligned, inwardly directed arrows. The magnetization at the bottom of the domain wall is represented as radially aligned, outwardly directed arrows. At mid-height of the bubble and the mid point of the domain wall, indicated by imaginary broken line 18, the magnetization is aligned in a circumferential direction.

The rotating in-plane field is operative to displace domain D in "layers" 11A and 11B and that displacement, if sufficiently rapid, in turn, is operative to change the wall magnetization in a manner which may be visualized as an undulating change in the magnetization within the domain wall upward and downward along the axis of the cylinder as viewed in FIG. 2. The changes in the magnetization occur at a frequency much higher than that of the in-plane drive field and are the result of domain displacement in the plane of movement regardless of how that displacement is caused.

These changes result in the formation of Bloch lines in the wall. The Bloch lines are represented by the vertical lines 20 shown in FIG. 3.

Figure 4:
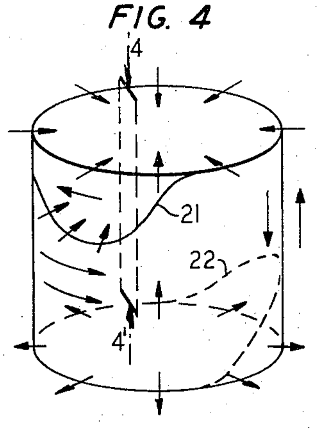
Figure 5:
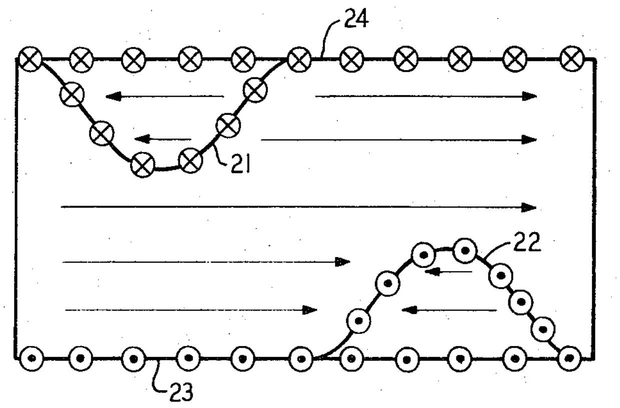
FIGS. 5, 6, and 7 are imaginary schematic representations of the magnetic configuration of a bubble wall during operation of a prior art bubble device.

Consider the domain wall of domain D in FIG. 4 to be a hollow tube nd imagine the magnetic configuration of the wall to be represented by the various arrows in the figure to be frozen as they appear for purposes of illustration. Consider further that the hollow tube is cut along plane 4–4′ and flattened. The resulting "structure" can be represented diagrammatically as a plane with respect to which the magnetization can be defined as shown in FIG. 5. Encircled dots in the figure represent magnetization directed out of the figure as viewed. Encircled X signs represent magnetization directed into the figure. The arrows represent magnetization and direction in the plane of the wall.

Figure 6:
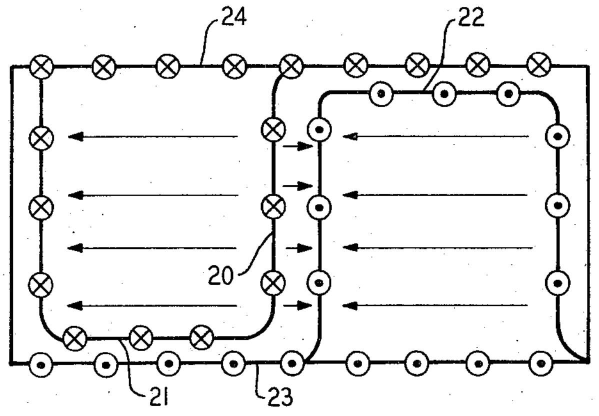

The difference in magnetic configuration of the wall between that shown in FIG. 4 and that shown in FIG. 2 is most notable at "bulges" 21 and 22 in FIGS. 4 and 5. These bulges change the wall magnetization to a form shown in FIG. 6 as domain D moves in the direction say of arrow $v$ in FIG. 2. When the bulges 21 and 22 reach the surfaces 23 and 24, respectively, of domain D as shown in FIG. 6, a first Bloch line pair 20 of FIG. 3 is formed with the magnetic configuration shown in FIG. 6.

Figure 7:
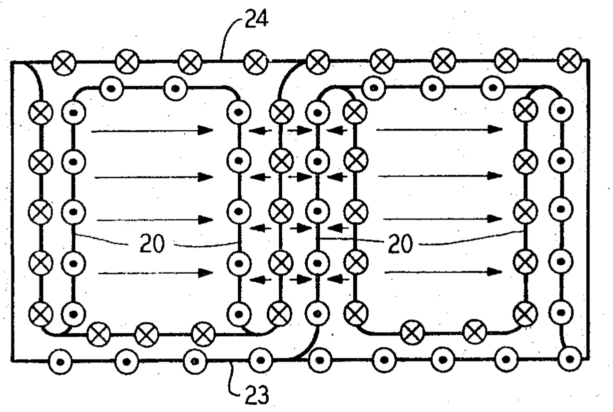

The bulge-forming process continues rapidly, reversing in direction to move from surface 23 to surface 24 and vice versa. In this manner multiple Bloch line formation occurs as diagrammed in FIG. 3. FIG. 7 shows a possible magnetic configuration for those lines when the line forming procedure has gone through one complete cycle. The movement of domain D at high speed initiates this process and the process continues in prior art structures until the domain wall includes a sufficient number of Bloch lines to form a dynamically stable configuration under the conditions present. This equilibrium condition is quickly reached once domain displacement occurs. The initial condition of FIG. 2 also is quickly restored once domain displacement ceases.

Figure 8:
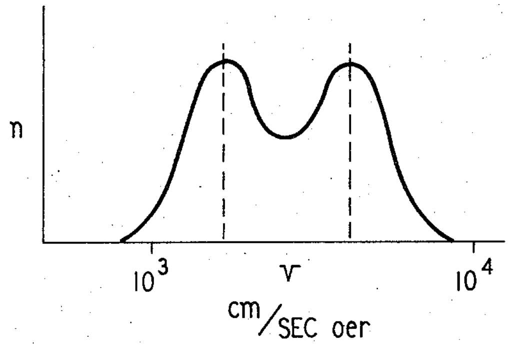
FIGS. 8 and 10 are graphs showing the distribution of bubble velocities achieved in prior art devices compared to those achieved in structures in accordance with this invention.

These changes in the magnetic structure of domain walls do not occur for all domains in a given bubble material of a typical prior art structure. Experimentation, for example, indicates the occurrence of a number of different types of domain walls of the above type as manifested by the different velocities achieved by different domains in a single bubble layer. FIG. 8 is a plot of a single domain moved over a predicted path under constant bias field conditions. That is, a given magnetic bubble was moved, by a known field gradient, large numbers of times from a first position to a second position. In each instance, the velocity of the bubble was plotted. The graph of FIG. 8 results. The graph shows first and second maxima which represent the presence of low speed (converted bubbles) and high speed (normal bubbles) movements even though only a single "normal" bubble is present when observed at rest. The graph is consistent with the Bloch line formation hypothesis described above.

A domain encompassed by a domain wall which includes a number of Bloch lines is called a hard bubble. Such bubbles often move in unpredictable directions but most usually move more slowly than a normal bubble in the same material. The elimination of the formation of bubbles of this type formed during operation of a bubble device results in a device of increased reliability and frequency capabilities.

Figure 9:
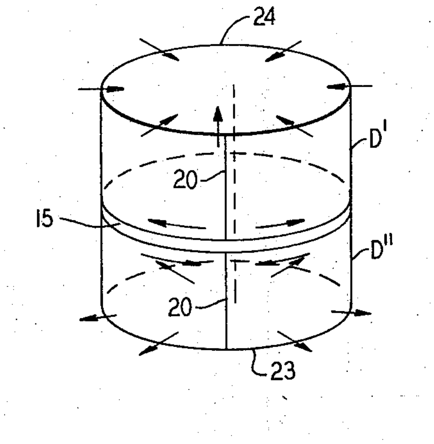

In accordance with the foregoing hypothesis, dynamic conversion of bubbles is suppressed by a structure which prevents the continuous movement of the magnetic bulges, described in connection with FIGS. 4 and 5, between surfaces of the bubble layer. FIG. 1 shows the fine structure of a bubble "layer" 11, in accordance with one aspect of this invention, which is operative to prevent such movement. FIG. 9 shows the magnetic configuration in a domain wall of a domain in a bubble layer of the type shown in FIG. 1. Although domain movement in such a structure occurs as if one domain extends through the two discrete bubble layers, the domain configuration may be imagined as two domains D′ and D″ energetically coupled but separated by a paramagnetic (nonmagnetic) layer 15 of FIG. 9.

The magnetic configuration of the double bubble configuration is such that the domain walls of domains D′ and D″ have their magnetization at the top and bottom surfaces (23 and 24) directed radially inwardly and outwardly, respectively. The magnetization of the walls of domains D′ and D″ adjacent layer 15 is directed peripherally. Such a configuration permits only negligible movement of the magnetic bulges described above which form numbers of Bloch lines. Indeed, only a single Bloch line (20 in FIG. 9) is created by rapid bubble displacement in the structure of FIG. 1.

Figure 10:
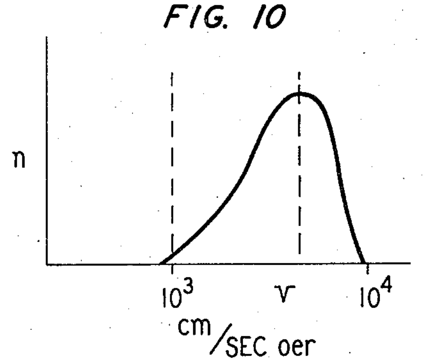

When the above-described experiment is repeated for the same magnetic bubble layer material as tested previously but with the fine structure of FIG. 1, the resulting graph does not exhibit the low velocity characteristic of FIG. 8. The characteristics for the structure of FIG. 1 are shown in FIG. 10 to include a single maximum corresponding to the high frequency maximum in FIG. 8. The width distribution along the abscissa is a function of the number of material imperfections; the fewer the imperfections, the less the width. Existing materials are known to be quite acceptable for commercial use on this score.

In one particular example of the embodiment of FIG. 1 an epitaxial layer of $Y_{1.9}Sm_{0.1}Ca_1Ge_1Fe_4O_{12}$ (garnet) 5.7 microns thick, was formed by liquid phase expitaxial techniques on a substrate of nonmagnetic Gd-Ga garnet. The intrinsic mobility of the layer was about 1,400 cm/sec-oe. The layer exhibited bubbles having a diameter of 5.6 $\mu$m in a bias field of 90 oersteds. A bubble was moved repeatedly over a distance of 5 $\mu$m by a field gradient of 1.2 oe/$\mu$m. The distribution shown in FIG. 8 resulted. An analogous structure was formed with the same materials except that a layer of nonmagnetic Gd-Ga garnet having a thickness of about 1,000 Angstrom units was formed on an epitaxial layer of $Y_{1.9}Sm_{0.1}Ca_1Ge_1Fe_4O_{12}$, 3 microns thick. An overlay of $Y_{1.9}Sm_{0.1}Ca_1Ge_1Fe_4O_{12}$ was formed over the nonmagnetic layer. This overlay was 3 $\mu$m thick. Bubbles having diameters of 5.9 $\mu$m were maintained by a bias field of 90 oe. Again, a bubble was moved repeatedly as before resulting in the characteristic of FIG. 10. Clearly dynamic conversion of the wall configuration is successfully suppressed by the structure and relatively high operating speeds can be realized with such a structure. This illustrative example calls for like-diameter domains in both magnetic bubble layers. Equal diameter domains are also shown for the two layers 11A and 11B in FIG. 1. This condition is necessary (within a couple of wall thicknesses) for the suppression of magnetic changes which occur in the walls of the bubbles at relatively high speeds and necessitates like (or compensating) magnetic films and thickness relationships for like bias field conditions as disclosed.

Structures of this type are useful for practical devices to an extent dictated also by the formation of hard bubbles under static conditions. Of course, not all materials exhibit hard bubbles under static conditions or at relatively low speeds (below a few hundred kc). In such material systems, for example structures of the type shown in FIG. 1 are quite useful as shown. In other systems, and particularly at high frequency (over 1 megacycle) both hard bubble suppression and the suppression of dynamic conversion to relatively immobile bubbles is important. Double-dipped layers, ion implanted surfaces, or magnetically soft overlays suppress hard bubble occurrence as is mentioned above. Accordingly, a practical high frequency bubble circuit in such material systems includes, for example, a double-dipped epitaxial bubble layer having first a low moment layer with a high moment overlayer as described in U.S. Pat. No. 3,701,127 of A. H. Bobeck and H. J. Levinstein, issued Oct. 24, 1972. A paramagnetic layer of Gd-Ga garnet, 25–1,000 Angstrom units thick, is grown over the double-dipped layer. An overlay of the high moment garnet, 3 $\mu$m microns thick is grown over the paramagnetic layer. The surface of the last-grown layer is exposed to an ion beam of protons, for example, at an energy of 25 kev and a surface density of $2 \times 10^{16}$ protons/cm$^2$ to suppress hard bubbles in the top layer (see 11*b* of FIG. 1).

Figure 11:
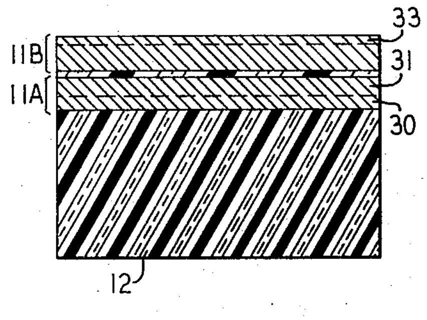

The resulting configuration is shown in FIG. 11. The bubble layer 11A adjacent substrate 12 is double-dipped in this embodiment to include sublayers 30 and 31. The bubble layer 11B includes an ion implanted surface region 33. The double-dipped configuration suppresses hard bubbles in the layer 11A; the ion implanted region suppresses hard bubbles in layer 11B. Layer 15 is operative to suppress the dynamic conversion of normal bubbles into relatively low mobility bubbles during high speed operation.

Figure 12:
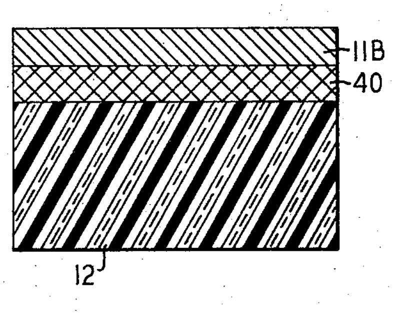

Generically, layer 15 is operative to allow only negligible magnetic changes in the wall of a magnetic bubble during high speed displacement of the bubble. On the other hand, such changes would not occur if either the top (D') or the bottom (D'') portion of the domain of FIG. 9, as viewed were present in the absence of the alternate portion so long as the remaining magnetic configuration as shown were unchanged. This same magnetic configuration is provided also by a structure as shown in FIG. 12. The bubble layer 11B in this embodiment is separated from the nonmagnetic substrate 12 by a layer of high permeability material 40. A domain in this configuration would appear as domain D' in FIG. 9 and would have a magnetic wall configuration as shown for domain D' in that figure.

An example of the embodiment of FIG. 12 would include a high permeability layer of $Y_3Fe_5O_{12}$ garnet having a thickness of 1 $\mu$m grown on a nonmagnetic substrate of $Gd_3Ga_5O_{12}$. The bubble layer 11B would comprise $Y_{1.9}Sm_{.1}Ca_1Ge_1Fe_4O_{12}$. Embodiments of this type could also be made by depositing high permeability permalloy on a nonmagnetic substrate and forming an amorphous metallic bubble layer thereon by RF sputtering techniques.

What has been described is considered merely illustrative of the principles of this invention. Therefore, various modifications can be devised by those skilled in the art within the spirit and scope of this invention as encompassed by the following claims.

What is claimed is:

1. A magnetic structure for the movement of single wall domains, said structure comprising a first layer of material in which single wall domains can be moved, said domains being characterized by changes in the magnetization configuration of the domain wall thereabout when displaced in said layer at a relatively high velocity, said structure including means coupled to said layer for suppressing said changes by allowing only negligible Bloch line formation in the walls of said domains wherein said means includes a nonmagnetic layer coupled to said first layer and a second layer of material in which single wall domains can be moved, said nonmagnetic layer having a thickness to inhibit exchange coupling between the magnetic spins of said first and second layers and permitting magnetostatic coupling between domains in corresponding positions of said first and second layers.

2. A structure in accordance with claim 1 wherein said first and second layers and said nonmagnetic layer are epitaxially formed on a single crystal nonmagnetic substrate.

3. A structure in accordance with claim 2 also including an ion implanted surface region in said second layer for suppressing hard bubbles therein.

4. A structure in accordance with claim 3 wherein said first layer includes first and second sublayers of high and low moment for suppressing hard bubbles therein.

5. A magnetic structure for the movement of single wall magnetic domains, said structure comprising first and second layers of magnetic material in which single wall magnetic domains can be moved, said structure also including a nonmagnetic layer separating said first and second layers and having a sufficient thickness to prevent exchange coupling between said first and second layers, said layers having properties and geometries and being disposed such that a magnetic domain and an associated substantially identical domain are formed in said first and second layers respectively, and said domain in said first layer is magnetostatically coupled to an associated domain in the other of said layers.

6. A magnetic structure comprising a first layer of material in which single wall domains can be moved, said first layer having first and second surfaces, each of said domains extending through said first layer between said surfaces and having a domain wall thereabout, said first layer being characterized by a preferred magnetization direction normal to the plane of said layer, said structure also including a second layer contiguous said second surface, said second layer having properties and being disposed to constrain the magnetization of said wall at said second surface to a peripheral orientation in the plane of said wall at high drive field frequencies wherein normal bubbles tend to be converted into hard bubbles.

7. A magnetic structure in accordance with claim 6 wherein said second layer comprises a nonmagnetic layer and said structure also includes a third layer of material in which single wall domains can be moved, said third, second and first layers being formed in succession by epitaxial techniques on a single crystal magnetic substrate, said second layer having a thickness to allow magnetostatic coupling between like-positioned domains in said first and third layers and to inhibit exchange coupling between spins in said first and third layers.

* * * * *